United States Patent Office 2,851,442
Patented Sept. 9, 1958

2,851,442
AMINO-ALDEHYDE RESINS

Clarence L. Michaud, Springfield, N. J., assignor to Celanese Corporation of America, New York, N. Y., a corporation of Delaware No Drawing. Application June 6, 1955
Serial No. 513,600

2 Claims. (Cl. 260—70)

This invention relates to amino-aldehyde resins and relates more particularly to amino-aldehyde resins modified with 3-methoxy butanol.

An important object of this invention is to provide a urea-formaldehyde or melamine-formaldehyde resin modified with 3-methoxy butanol.

Other objects of this invention will be apparent from the following detailed description and claims.

According to the present invention, there is prepared a urea-formaldehyde or melamine-formaldehyde resin modified with 3-methoxy butanol. This resin is compatible both with aqueous and non-aqueous solvent systems so that it may be readily incorporated into coating and other formulations of many types. It shows good compatibility with alkyd resins, both plain and oil-modified, so that it may be added to enamel compositions containing such alkyd resins. In addition, coating compositions containing the urea-formaldehyde and melamine-formaldehyde resins modified with 3-methoxy butanol exhibit good levelling properties so that no separate levelling agents need be added thereto, and they also show an excellent adhesion to the surfaces on which they are coated.

In preparing the resins of this invention, the proportions of urea and formaldehyde and the proportions of melamine and formaldehyde are those commonly employed in making alcohol modified amino-aldehyde resins. For each mol of urea, there may be employed from about 2.1 to 2.5 mols of formaldehyde, and for each mol of melamine, there may be employed from about 2 to 6 mols of formaldehyde. The quantity of 3-methoxy butanol that is employed ranges from about 1.45 to 1.95 mols for each mol of urea or melamine. As the ratio of 3-methoxy butanol is increased, there is obtained a resin having a slightly lower viscosity. Not all the 3-methoxy butanol employed reacts with the basic resin, the unreacted portion remaining as a solvent in the resin. The formaldehyde may be added to the resin-forming materials as an aqueous solution, as paraformaldehyde, as a solution in the 3-methoxybutanol, or in any other desired form.

The several materials making up the resin of this invention are mixed together in the desired proportions, together with a sufficient amount of an alkaline catalyst to bring the pH of the mixture to between about 7.4 and 8.0. Examples of suitable alkaline materials that may serve as catalysts are triethanolamine, borax, sodium hydroxide, potassium hydroxide and sodium carbonate. Thereafter, the mixture is heated to an elevated temperature, which may be the reflux temperature, and held at this temperature until the first stage of the reaction between the urea or melamine and the formaldehyde has taken place. There is then added to the reaction mixture, a sufficient quantity of an acid catalyst to bring the pH of the said mixture to between about 3.5 and 4.5. Examples of suitable acid materials for this purpose are phosphoric acid, phthalic anhydride, oxalic acid, butyl phosphoric acid and formic acid. The mixture is held at an elevated temperature, which may be the reflux temperature, until the 3-methoxy butanol has reacted with the product of the first stage of the resin-forming reaction. At this point, the acid catalyst is neutralized with an alkaline material such as, for example, di-N-normal butyl amine, or sodium hydroxide, to bring the pH of the mixture to between about 6.5 and 7.0. The water that is present in the reaction system is removed therefrom by distillation. The 3-methoxy butanol forms no azeotropes with water so that the distillation of the water from the reaction mixture presents no special problems.

The resin of this invention is well suited for use in the formulation of coating compositions, such as baking enamels. In preparing such coating compositions, the resin is compounded in a suitable solvent or solvent mixture with other film-forming materials such as alkyd resins, plain or oil modified, melamine resins or epoxy resins, and pigments such as titanium dioxide. The resin of this invention may also, because of its compatibility with water and aqueous solvent systems, be added to water-based paint formulations. In addition, the said resin may be employed in sizing and finishing compositions for textile and related materials.

After the modified resin of this invention has been applied as a coating composition, for example, it may be hardened by baking the same at an elevated temperature in a manner well known in the art. Thus, when the modified resin is incorporated into an alkyd resin based coating composition, the said composition may be baked at a temperature of between about 285 and 325° C. for a period of between about 20 and 30 minutes.

This invention will be described in the following examples specifically in connection with modified urea-formaldehyde resins to which it is especially suited. It may, however, as pointed out above, also be employed in connection with modified melamine-formaldehyde resins.

Example I

There is dissolved in 359 parts by weight of aqueous formaldehyde (37% by weight, inhibited), 120 parts by weight of urea and 379 parts by weight of 3-methoxy butanol, together with sufficient triethanolamine to bring the pH of the solution to 7.4. The mixture is heated to reflux (101° C.) and held at this temperature for 10 minutes. A sufficient quantity of a 25% by weight solution of phosphoric acid (technical, 86% phosphoric) is then added to the reaction mixture to bring its pH to 3.7 and this mixture is held at reflux temperature for 60 minutes. The pH of the resultant mixture is then brought to 6.9 by the addition of di-N-normal butyl amine and the water is removed from the mixture by distillation to a temperature of 116° C. There is obtained 520 parts by weight of a clear resin having a solids content of 48% by weight. The said resin is miscible with an equal volume of xylol, four times its volume of water and is miscible in all proportions with normal butanol.

Example II

A sufficient amount of 50% aqueous triethanolamine is added to 585 parts by weight of aqueous formaldehyde (37% by weight, inhibited) to bring the pH to 7.4–7.5. There is then added to the formaldehyde 172 grams of urea and the whole is heated to 54° C., following which there is added 489 parts by weight of 3-methoxy butanol and 54 parts by weight of butanol and heating is continued until the reflux temperature (101° C.) is reached. The temperature is held at reflux for 15 minutes and the batch is cooled to 93° C. and there is added thereto a sufficient amount of 25% by weight aqueous phosphoric acid to reduce the pH to 3.3. The whole is then refluxed for 2 hours and then water is distilled off until the temperature reaches 115° C. at which time 8 inches of vacuum is applied and distillation is continued until the temperature again reaches 115° C. There is obtained 1375 parts by weight of resin having a solids content of 52% by weight, a viscosity of 9000 centipoises at 25° C., and an acid number of 5.0. Ten cc. of the resin tolerate 27 cc. of xylol, 18 cc. of water and 2.5 cc. of mineral spirits.

*Example III*

To 78 parts by volume of a conventional baking enamel mixture containing pigment, alkyd resin and vehicle, there is added 22 parts by volume of the resin produced in Example I. The resin is compatible with the said mixture. The resultant product is sprayed onto a metal sheet and levels off well to form a smooth even coating. The coated sheet is baked at 285° C. for 20 minutes to produce a hard, white enamel coating which adheres tenaciously to the metal sheet.

It is to be understood that the foregoing detailed description is merely given by way of illustration and that many variations may be made therein without departing from the spirit of my invention.

Having described my invention, what I desire to secure by Letters Patent is:

1. Process for preparing a 3-methoxy butanol-modified amino-aldehyde resin which comprises reacting together in the presence of an alkaline catalyst formaldehyde and urea, and reacting the product so formed in the presence of an acid catalyst with 3-methoxy butanol, there being employed from about 2.1 to 2.5 mols of formaldehyde for each mol of urea, and from about 1.45 to 1.95 mols of 3-methoxy butanol for each mol of urea.

2. Process for preparing an alcohol-modified urea-formaldehyde resin, which comprises heating a mixture of 2.1 to 2.5 moles of formaldehyde, one mole of urea, and 1.45 to 1.95 moles of 3-methoxy butanol at a pH of 7.4 to 8.0 to effect reaction of the urea and formaldehyde, heating the resulting product in the presence of an acid catalyst at a pH of 3.5 to 4.5 to react the 3-methoxy butanol with the product of the first stage of the reaction, and then neutralizing the resulting product.

References Cited in the file of this patent

UNITED STATES PATENTS

| 2,350,894 | Honel | June 6, 1944 |
| 2,514,505 | Morton | July 11, 1950 |

FOREIGN PATENTS

| 579,651 | Germany | June 29, 1933 |